(12) United States Patent
Tan et al.

(10) Patent No.: US 8,667,609 B2
(45) Date of Patent: Mar. 4, 2014

(54) SYSTEM TO INFORM ABOUT TRADEMARKS SIMILAR TO PROVIDED INPUT

(71) Applicant: Sky Castle Global Limited, Tortola (VG)

(72) Inventors: Edwin Tan, Beaverton, OR (US); Michael E St. John, Jr., Milford, PA (US)

(73) Assignee: Sky Castle Global Limited, Tortola (VG)

( * ) Notice: Subject to any disclaimer, the term of this patent is extended or adjusted under 35 U.S.C. 154(b) by 0 days.

(21) Appl. No.: 13/830,450

(22) Filed: Mar. 14, 2013

(65) Prior Publication Data

US 2013/0254124 A1 Sep. 26, 2013

Related U.S. Application Data

(63) Continuation of application No. 13/310,557, filed on Dec. 2, 2011.

(60) Provisional application No. 61/419,128, filed on Dec. 2, 2010.

(51) Int. Cl.
*G06F 7/04* (2006.01)
*G06F 21/62* (2013.01)
*H04L 9/36* (2006.01)

(52) U.S. Cl.
CPC .............. *G06F 21/6272* (2013.01); *H04L 9/36* (2013.01)
USPC ............ 726/32; 726/33; 726/3; 726/4; 726/5; 726/6; 713/168; 713/169; 713/170; 713/171; 713/172

(58) Field of Classification Search
CPC ............................... G06F 21/6272; H04L 9/36
USPC .......................................................... 726/32
See application file for complete search history.

(56) References Cited

U.S. PATENT DOCUMENTS 6,138,106 A 10/2000 Walker et al.
6,375,073 B1 4/2002 Aebi et al.
(Continued)

FOREIGN PATENT DOCUMENTS

EP 1531416 A1 5/2005
KR 20000035847 A 6/2000
(Continued)

OTHER PUBLICATIONS

Andrius, "Craigslist Rolls Out new Phone Verification," *Young, Dumb and full of Web 2.0*. Blogspot.com, Google, Feb. 29, 2008, <http://esaleguys.blogspot.com/2008/02/craigslist-rolls-out-new-phone.html> [Accessed Oct. 13, 2009].

(Continued)

*Primary Examiner* — Longbit Chai
(74) *Attorney, Agent, or Firm* — Perkins Coie LLP (57) ABSTRACT

Various embodiments of the present invention generally relate to trademark searching and notification systems. More specifically, various embodiments of the present invention relate to systems and methods for informing requesters about trademarks similar to a provided input. Some embodiments of the present invention provide for a proactive system in which users are notified of similar trademarks before using specific term(s) and users proceed after understanding which trademarks actually exist and what areas those trademarks actually entail, and possibly being notified of newly applied trademarks and modified trademarks at later times that are similar to the specific term(s) being used.

21 Claims, 6 Drawing Sheets

(56) References Cited

U.S. PATENT DOCUMENTS

| | | |
|---|---|---|
| 6,782,080 B2 | 8/2004 | Leivo et al. |
| 7,000,028 B1 | 2/2006 | Broadhurst et al. |
| 7,003,500 B1 | 2/2006 | Driessen |
| 7,246,046 B2 | 7/2007 | Coakley |
| 7,295,658 B2 | 11/2007 | Moon et al. |
| 7,337,947 B1 | 3/2008 | Swanson, Sr. |
| 7,440,922 B1 | 10/2008 | Kempkes et al. |
| 7,697,920 B1 | 4/2010 | McClain |
| 7,792,751 B2 | 9/2010 | Tan |
| 8,406,392 B2 | 3/2013 | Tan |
| 8,504,395 B2 | 8/2013 | Vago et al. |
| 2001/0042784 A1 | 11/2001 | Fite et al. |
| 2002/0046341 A1 | 4/2002 | Kazaks et al. |
| 2002/0091541 A1 | 7/2002 | Lundberg |
| 2002/0091649 A1 | 7/2002 | Anvekar et al. |
| 2002/0095390 A1 | 7/2002 | Hovsepian |
| 2002/0190123 A1 | 12/2002 | Anvekar et al. |
| 2003/0004828 A1 | 1/2003 | Epstein |
| 2003/0033246 A1 | 2/2003 | Slater |
| 2003/0069974 A1 | 4/2003 | Lu et al. |
| 2003/0104174 A1 | 6/2003 | Itakura et al. |
| 2003/0128827 A1 | 7/2003 | Khan |
| 2003/0144935 A1 | 7/2003 | Sobek |
| 2003/0154179 A1 | 8/2003 | Mercer |
| 2003/0208624 A1 | 11/2003 | Grossman |
| 2004/0007618 A1 | 1/2004 | Oram et al. |
| 2004/0088250 A1 | 5/2004 | Bartter et al. |
| 2004/0139318 A1 | 7/2004 | Fiala et al. |
| 2004/0181453 A1 | 9/2004 | Ray et al. |
| 2004/0193490 A1 | 9/2004 | Pletz |
| 2004/0260607 A1 | 12/2004 | Robbins et al. |
| 2005/0157801 A1 | 7/2005 | Gore et al. |
| 2005/0199706 A1 | 9/2005 | Beck et al. |
| 2006/0116891 A1 | 6/2006 | Muller et al. |
| 2006/0129501 A1 | 6/2006 | Pastusiak et al. |
| 2006/0138215 A1 | 6/2006 | Pallares |
| 2006/0161879 A1 | 7/2006 | Lubrecht et al. |
| 2006/0190275 A1 | 8/2006 | Dupree et al. |
| 2006/0212925 A1* | 9/2006 | Shull et al. .................. 726/1 |
| 2006/0213984 A1 | 9/2006 | Walker et al. |
| 2006/0233269 A1 | 10/2006 | Bhushan et al. |
| 2006/0261154 A1 | 11/2006 | Arthur et al. |
| 2006/0293963 A1 | 12/2006 | Hoblit |
| 2007/0094129 A1 | 4/2007 | Graves et al. |
| 2007/0100707 A1 | 5/2007 | Driessen et al. |
| 2007/0110127 A1 | 5/2007 | Mergen et al. |
| 2007/0112655 A1 | 5/2007 | Jones |
| 2007/0118478 A1 | 5/2007 | Graves et al. |
| 2007/0208869 A1 | 9/2007 | Adelman et al. |
| 2007/0250920 A1 | 10/2007 | Lindsay |
| 2007/0272743 A1 | 11/2007 | Christie et al. |
| 2007/0288326 A1 | 12/2007 | Boldin |
| 2008/0022375 A1 | 1/2008 | Stanley |
| 2008/0041938 A1 | 2/2008 | Wise |
| 2008/0059485 A1 | 3/2008 | Finn |
| 2008/0065611 A1 | 3/2008 | Hepworth et al. |
| 2008/0070548 A1 | 3/2008 | Cha et al. |
| 2008/0270282 A1 | 10/2008 | Colucci-Zieger |
| 2008/0319908 A1 | 12/2008 | Venkatachalam et al. |
| 2009/0013396 A1 | 1/2009 | Rajunas, III |
| 2009/0132424 A1 | 5/2009 | Kendrick et al. |
| 2009/0138466 A1 | 5/2009 | Henry et al. |
| 2009/0192928 A1 | 7/2009 | Abifaker |
| 2009/0299731 A1 | 12/2009 | Owen |
| 2011/0225019 A1 | 9/2011 | Taylor et al. |
| 2012/0323804 A1 | 12/2012 | Lee |

FOREIGN PATENT DOCUMENTS

| | | |
|---|---|---|
| KR | 20010084957 A | 9/2001 |
| KR | 20030013074 A | 2/2003 |
| KR | 20030091077 A | 12/2003 |
| KR | 20040075191 A | 8/2004 |
| KR | 20080028686 A | 4/2008 |
| WO | WO-0111443 A2 | 2/2001 |
| WO | WO-2007086068 A2 | 8/2007 |

OTHER PUBLICATIONS

Furletti, M., "Prepaid Card Markets & Regulation," Federal Reserve Bank of Philadelphia, Payment Cards Center, pp. 1-18, Feb. 2004.

Extended European Search Report with Supplementary European Search Report and European Search Opinion EP 09759240.6 dated Jan. 23, 2012, pp. 1-8.

International Search Report and Written Opinion for PCT/US2008/010044 dated Mar. 24, 2009.

International Search Report and Written Opinion for PCT/US2009/003101 dated Dec. 30, 2009.

International Search Report and Written Opinion for PCT/US2009/045965 dated Jan. 14, 2010.

International Search Report and Written Opinion for PCT/US2009/051011 dated Feb. 17, 2010.

International Search Report and Written Opinion for PCT/US2009/057290 dated Jun. 21, 2011.

Office Action Mailed Feb. 24, 2012, in Chinese Patent Application No. 200980130784.7, pp. 1-3.

Office Action Mailed Dec. 1, 2011, in Chinese Patent Application No. 200980130786.6, pp. 1-4.

Co-pending U.S. Appl. No. 11/903,227 by Tan, E., filed Sep. 20, 2007.

U.S. Appl. No. 12/134,149 by Tan, E., filed Jun. 5, 2008, now issued as U.S. Patent No. 7,792,751.

Co-pending U.S. Appl. No. 12/191,161 by Tan, E., filed Aug. 13, 2008, Issued as U.S. Patent No. 8,406,392.

Co-pending U.S. Appl. No. 12/628,040 by Tan, E., filed Nov. 30, 2009.

Co-pending U.S. Appl. No. 12/992,256 by Tan, E., filed Dec. 15, 2010.

Co-pending U.S. Appl. No. 13/310,557 by Tan, E., et al. filed Dec. 2, 2011.

Co-pending U.S. Appl. No. 13/346,661 by Tan, E., filed Jan. 9, 2012.

Co-pending U.S. Appl. No. 13/830,450 by Tan, E., et al. filed Mar. 14, 2013.

Co-pending U.S. Appl. No. 13/830,655, by Tan, E., et al. filed Mar. 14, 2013.

U.S. Appl. No. 13/850,049 by Tan, E., filed Mar. 25, 2013, now abandoned.

Non-Final Office Action mailed Sep. 6, 2013, in Co-pending U.S. Appl. No. 12/992,256 by Tan, E., filed Dec. 15, 2010.

Restriction Requirement Mailed Feb. 2, 2011 in Co-pending U.S. Appl. No. 11/903,227 by Tan, E., filed Sep. 20, 2007.

Non Final Office Action Mailed Mar. 21, 2011 in U.S. Appl. No. 11/903,227 by Tan, E., filed Sep. 20, 2007.

Final Office Action Mailed Sep. 13, 2011 in U.S. Appl. No. 11/903,227 by Tan, E., filed Sep. 20, 2007.

Non-Final Office Action Mailed Mar. 12, 2009 in Co-pending U.S. Appl. No. 12/134,149 by Tan, E., filed Jun. 5, 2008.

Final Office Action Mailed Aug. 20, 2009 in Co-pending U.S. Appl. No. 12/134,149 by Tan, E., filed Jun. 5, 2008.

Notice of Allowance Mailed Jan. 13, 2010 in U.S. Appl. No. 12/134,149 by Tan, E., filed Jun. 5, 2008.

Notice of Allowance Mailed Jul. 26, 2010 in Co-pending U.S. Appl. No. 12/134,149 by Tan, E., filed Jun. 5, 2008.

Restriction Requirement Mailed Nov. 9, 2010 in Co-pending U.S. Appl. No. 12/628,040 by Tan, E., filed Nov. 30, 2009.

Non-Final Rejection Mailed Jan. 4, 2011 in Co-pending U.S. Appl. No. 12/628,040 by Tan, E., filed Nov. 30, 2009.

Restriction Requirement Mailed Aug. 23, 2011 in Co-pending U.S. Appl. No. 12/628,040 by Tan, E., filed Nov. 30, 2009.

Final Office Action Mailed Nov. 7, 2011 in Co-pending U.S. Appl. No. 12/628,040 by Tan, E., filed Nov. 30, 2009.

Advisory Action Mailed Apr. 3, 2012 in U.S. Appl. No. 12/628,040 by Tan, E., filed Nov. 30, 2009.

Restriction Requirement Mailed May 14, 2012 in Co-pending U.S. Appl. No. 13/346,661 by Tan, E., filed Jan. 9, 2012.

(56) References Cited

OTHER PUBLICATIONS

Non-Final Office Action Mailed Jul. 16, 2012, in Co-pending U.S. Appl. No. 13/346,661 by Tan, E., filed Jan. 9, 2012.
Final Office Action Mailed Jan. 3, 2013, in Co-pending U.S. Appl. No. 13/346,661 by Tan, E., filed Jan. 9, 2012.
Non-Final Office Action Mailed Mar. 29, 2012, in U.S. Appl. No. 12/191,161 by Tan, E., filed Aug. 13, 2008.
Non-Final Office Action Mailed Oct. 16, 2012, in U.S. Appl. No. 12/191,161 by Tan, E., filed Aug. 13, 2008.
Notice of Allowance Mailed Nov. 16, 2012, in U.S. Appl. No. 12/191,161 by Tan, E., filed Aug. 13, 2008.
Restriction Requirement mailed Aug. 15, 2013, in Co-pending U.S. Appl. No. 13/310,557 by Tan, E., et al. filed Dec. 2, 2011.
Non-Final Office Action mailed Sep. 13, 2013, in Co-pending U.S. Appl. No. 13/310,557 by Tan, E., et al. filed Dec. 2, 2011.
Restriction Requirement mailed Aug. 16, 2013, in Co-pending U.S. Appl. No. 13/830,655, by Tan, E., et al. filed Mar. 14, 2013.
Non-Final Office Action mailed Oct. 17, 2013, in Co-pending U.S. Appl. No. 13/830,655, by Tan, E., et al. filed Mar. 14, 2013.

\* cited by examiner

SYSTEM TO INFORM ABOUT TRADEMARKS SIMILAR TO PROVIDED INPUT

CROSS-REFERENCE TO RELATED APPLICATIONS

This application is a continuation of U.S. patent application Ser. No. 13/310,557 filed on Dec. 2, 2011 entitled "System to Inform About Trademarks Similar to Provided Input," which claims the benefit of U.S. Provisional Application Ser. No. 61/419,128 filed on Dec. 2, 2010 entitled "System to Inform about Trademarks Similar to Provided Input" which are hereby incorporated by reference for all purposes in their entirety.

TECHNICAL FIELD

Various embodiments of the present invention generally relate to trademark searching and notification systems. More specifically, various embodiments of the present invention relate to systems and methods for informing requesters about trademarks similar to a provided input.

BACKGROUND

A trademark is a distinctive sign or indicator used by businesses, individuals, organizations and other legal entities to identify and distinguish their goods and services from those from other entities. A trademark may be a name, word, phrase, logo, symbol, design, image, or a combination of these elements. Business, individuals, organizations and other legally-recognized entities may register a trademark with appropriate government or international bodies. The owner of a registered trademark may take legal action against any unauthorized use of their trademark.

Rights to a trademark are commonly, but not always limited by legal jurisdictions. For example, the US Patent & Trademark Office accepts registrations for and manages records of pending and registered US trademarks, while the UK Intellectual Property Office accepts registrations for and manages records of pending and registered UK trademarks. There exist organizations and groupings that allow for multi-jurisdictional registration of marks. One such system is the Madrid System. Another such system is the Community Trade Mark system in the European Union.

Business, individuals, organizations and other legally-recognized entities need not necessarily register their distinctive name, word, phrase, logo, symbol, design, image or other identifying elements with a government or international entity such as the USPTO or the Madrid System. This is because there exists, in certain countries such as Germany, provisions that provide limited common law rights for unregistered marks of goods and services that occupy a highly significant position in the marketplace.

Internet domain names are one area where infringement of trademarks may occur. The Internet has been a prominent feature of our lives since the latter part of the 20th century. Examples of services, resources and functions that get delivered over the Internet include the World Wide Web, with the delivery of requested information in HTML (Hypertext Markup Language) and other similar formats that include but is most certainly not limited to PHP, JSP, Flash, DHTML, ASP, ASPX and more. This information is often delivered over a web browser such as Apple Safari and Mozilla Firefox, and is commonly accessed and identified by primary identifiers known as internet domain names. These internet domain names provide easily recognizable and memorizable names to numerically-addressed Internet resources. Examples of domain names include apple.com, whitehouse.gov, google.co.uk, and mit.edu.

Internet domain names are used as an addressing method for accessing a plethora of other services, such as accessing and transferring files via the File Transfer Protocol (FTP). Internet domain names are also, among other purposes, used to identify the senders and recipients of electronic mail (e-mail) and to manage routes for the actual transmission of these e-mail messages. It is clear that domain names play an extremely critical function in the operation of the Internet. Other uses of domain names as an addressing method include SFTP (Secure File Transfer Protocol), RTSP (Real Time Streaming Protocol), and more.

Domain names have multiple components. In the example of apple.com, 'apple' is the second-level domain (SLD), while 'corn' is the top-level domain (TLD), otherwise known as a suffix. Examples of TLDs are .com, .net, .org, .info, .biz, .mobi, and .name. Other TLDs include country-code variants (otherwise known as ccTLDs) such as .de, .co.uk, and .com.cn. TLDs are managed by registries (also known as registry operators). For example, '.com' is managed and run by Verisign, Inc., while '.org' is managed and run by the Public Interest Registry and '.uk' is managed and run by Nominet UK. These registries maintain domain name registration information. In most cases, registry operators contract with designated (or accredited) domain name registrars (for example, eNom, Inc., Network Solutions, LLC, etc.) to provide domain name registration services to the public (end users) with minimal limitations. Registrars may then offer registration of domain names through reseller affiliates. End-users may register any domain name through registrars or their resellers. A domain name may generally be registered for up to a maximum period of 10 years.

End-users are generally allowed to register any domain name they want, so long as the domain name is not presently registered. In most cases, the registration process is a simple one. The end-user goes to the website of a domain name registrar (or its reseller), types in the domain name that he/she is interested in registering, and the registrar (or its reseller) performs a check for the availability of that domain name with the registry. If the domain name is available, the end-user may then register that domain name with a payment. At this time, the registrar ensures that the domain name is added to the registry. When the registration process is complete, the end-user who is now the owner of a domain name is known as a 'registrant'.

The registrant (domain name owner) may elect to create subdomains (third-level domains, or even more). For example, Google, Inc., a search engine provider with a primary domain name of google.com, may elect to create a subdomain name 'news', resulting in a public-facing address 'news.google.com'. Subdomains allow for an extremely large number of potential addresses to be created on the internet.

New TLDs are constantly being introduced (mostly global TLDs, or gTLDs), formerly dormant/unused ccTLDs are being reintroduced or relaunched (an example being .co), and new countries result in the creation of completely new ccTLDs. For example, 7 new TLDs were introduced in 2001 and 2002. These were .biz, .info, .name, .pro, .aero, .coop, and .museum. In 2003, six more new TLDs (.asia, .cat, .jobs, .mobi, .tel and .travel) were introduced. These new TLDs result in more opportunities for unique SLDs to be registered (for example, telephone.com may not be available, but telephone.mobi may be available for registration). More gTLDs are being introduced in coming years as ICANN (the Internet Corporation for Assigned Names and Numbers) loosens limitations and allows for applications from entities who want to run their own gTLD.

Additionally, new name character sets (aside from the former ASCII limitations) have been introduced, allowing for the registration of Internationalized Domain Names in native characters from languages such as Arabic, Chinese, Russian and more.

Another area where end-users on the Internet may register names of their own is on services (social networking sites, blog sites, instant messaging, and more) such as Facebook, MySpace, Twitter, Blogspot, Linkedin, and AOL Instant Messenger. Many of these privately run services provide users with opportunities to secure a username that becomes part of a public-facing web address. For example, Mark Zuckerberg, who is an instance of a Facebook (social network site) user, may register 'facebook.com/zuck', where the 'zuck' component of the web address was selected by the end user. In another case, Nouriel Roubini, who is an instance of a Blogspot (weblog/web journal service) user, may register 'nourielroubini.blogspot.com', where the 'nourielroubini' component of the web address was selected by the end user. In yet another example, Starbucks Corporation, which is a corporation that has a Twitter (service for high-speed status update transmission and sharing) profile/presence, may register http://twitter.com/starbucks, where the 'starbucks' component of the web address was selected by the end user. The list of examples mentioned in this paragraph is by no means exhaustive. There are many more examples of public-facing usernames hosted by privately-run services. In a final example for this section, Justin Bieber, who is an instance of an AOL Instant Messenger (AIM) user, may register 'justinbieber' as his AIM screen name.

In summary, there is a multitude of opportunities on the Internet where an individual or entity may create a new web address (e.g., domain names, subdomains, networking sites, and blog services), or a unique identifier (e.g., instant messaging services) associated with the use of web-based services. The number of such opportunities is expanding as new TLDs are launched and as dormant TLDs get revived or relaunched. This number of opportunities is also increased by the ever-growing number of social networks, blog services, and more.

SUMMARY

Various embodiments of the present invention generally relate to trademark searching and notification systems. More specifically, various embodiments of the present invention relate to systems and methods for informing requesters about trademarks similar to a provided input (e.g., a domain name, an e-mail address, instant messaging user name, or an advertisement). For example, some embodiments include receiving, from a requester, a request to perform a trademark search for a provided input. The requester, for example, can be an individual, an organization, a service provided, etc. One or more databases can be searched for trademarks related to the provided input. In some embodiments, for example, the provided input can be directly used for searching the databases. In other cases, the provided input can be processed or parsed into phrases for searching the databases. Based on the returned trademarks, a relevance score for each trademark can be determined. The relevance score can be based on a variety of inputs and factors such as status of a trademark, filing date, first use date, litigation history, comparison of potential classes with classes assigned to the trademarks, and others. Then, a notification can be generated based at least in part on the relevance score.

Some embodiments of the notification system include a communications module, a parsing module, a searching module, a notification module, a graphical user interface module, a verification module, and/or other modules or components. The communications module can be configure to receive a request to perform a trademark search for a provided input. The parsing module can be configured to parse or process the provided input into phrases for searching. The searching module can be configured to receive the phrases from the parsing module and search (e.g., using exact matches, phonetic matches, and/or natural language matches) one or more database for trademarks related to the phrases.

The notification module can be configured to receive the trademarks related to the phrases and generate a notification. In some cases, the notification module can determine a relevance of the trademarks related to the phrases before generating the notification, wherein the relevance of the trademark is based on a status, a filing date, a first use date, a registration date, keyword matches between the description of the trademark and the context of use of the keyword within the provided input, a trademark jurisdiction, or an involvement of the trademark owner. The graphical user interface module can be configured to generate one or more user interface screens configured to display the notification to a recipient and receive a verification from the user that the user has reviewed the notification.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to trademark searching and notification systems. More specifically, various embodiments of the present invention relate to systems and methods for informing requesters about trademarks similar to a provided input. Current means of enforcement of trademark rights by trademark owners involve filing lawsuits, using arbitration, and sending cease and desist letters, and more. Use of such methods in today's information-rich world is often ham-fisted and akin to attempting to smash a fly with a hammer. There exists a great deal of information asymmetry between those who can unwittingly or deliberately misuse a trademark or a term similar to the trademark, and what the actual owners of trademarks actually want the world to know.

Instead of a complaints-based system where a platform operator has to respond to complaints from trademark owners, some embodiments of the present invention provide for a proactive system in which users are notified of similar trademarks before using specific term(s) and users proceed after understanding which trademarks actually exist and what areas those trademarks actually entail, and possibly being notified of newly applied trademarks and modified trademarks at later times that are similar to the specific term(s) being used. This notification or alert from a service provider and a recipient of services may optionally be a component of the Terms of Service of the service provider.

Various embodiments of the systems and methods described herein provide for a fast, simple way to search/request/check whether the manner in which they are about to use a given term, phrase, or identification string is not likely to be infringing on an existing trademark. This search/request/check, and the subsequent verifiability that such a step had taken place, reduces the likelihood that willful infringement of a trademark will take place, thereby eliminating unnecessary distress and costs to all parties.

Among other things, some embodiments of the proposed systems and methods enable individuals and organizations to obtain/receive a list of trademarks similar to a given keyword or phrase, and to achieve a verifiable record of them doing so, which may serve various purposes including (i) demonstrating that adequate due diligence had been performed prior to the usage of a specific keyword or phrase in any context, (ii) altering their behavior of usage of the term(s) in question to avoid conflicts with existing classes of similar trademarks, (iii) performing precautionary checks/scans on a regular basis to ensure that their usage of a keyword or phrase is not in conflict with a new trademark, (iv) responsibly providing alerts and notifications as a provider of a platform or medium that allows for potential misuse of a trademark or trademark-similar term, (v) detecting attempts to register a trademark where the user of the keyword/phrase has already had de facto rights to the term by virtue of continued use of the term, or more.

In addition, various embodiments provide for the initiation of a means of data compilation including a list, indexed database, XML database, relational database, object database, or other data storage method, in preparation for subsequent storage of trademark information and data. Trademark data includes, but is not limited, date(s), status, classes, serial number/identifiers, image(s), description(s), jurisdiction(s), and other identifying and/or classifying information such as legal precedents—past lawsuits/disputes over the use of that keyword. The compilation of trademark data can be updated regularly against their respective sources. In some embodiments, the sources are accessed directly for the searching. Various embodiments also provide for various interfaces, mechanisms, and system by which entities can submit their own marks (which may be unregistered, non-default) with possible/optional verification of credentials for injection into data compilation. The compilation of submitted data may be regularly against their respective sources.

Upon receiving an analysis request, various embodiments process raw input in preparation for comparison search. The comparison searches can be verified through the use of unique identifier(s) created for each search/request/check. In some embodiments, an identifier can include a timestamp, search id, user id, search type, etc. In some cases, unique identifiers can be assigned to the requester and the recipient. Logging (recording/storage) in system of verifiable (time stamp, etc) record/message of the properties and results of executed search/request/check, storing date and time of search, search party ID, search query, results transmitted, result count, and all other information as previously outlined. Some embodiments also log a verifiable record/message that said results were actually displayed or transmitted to a recipient. The system can make records available to registrar, registrant, possibly in the form of control panel. Back up record of properties of search/request/check, the results, and subsequent transmission, to alternate system (e.g., geographically diverse offsite location).

Output of search/request/check can be a list, which can take the form of a table with these possible columns: the relevant trademark detected, % degree of relevance and/or the % degree of similarity, date(s), status, classes, serial number/identifiers, image(s), description(s), jurisdiction(s), and other identifying and/or classifying information such as past lawsuits/disputes over the use of that keyword. Other forms of data output include a digital or printable report, a database, a webpage with links, an e-mail message, an audio message, and more.

If a specific search/request/check is a regular, repeating event, optionally check for previously displayed results to ensure that only new or changed results are emphasized. This may take the form of date comparisons, whole-list comparisons, annotations, or other forms of differentiating when a particular result has changed since the last time it appeared in a previous search/request/check.

The techniques introduced here can be embodied as special-purpose hardware (e.g., circuitry), or as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to various embodiments," "in the embodiments shown," "in one embodiment," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or to different embodiments.

If the specification states a component or feature "may", "can", "could", or "might" be included or have a characteristic, that particular component or feature is not required to be included or have the characteristic.

The term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

General Description

Figure 1:
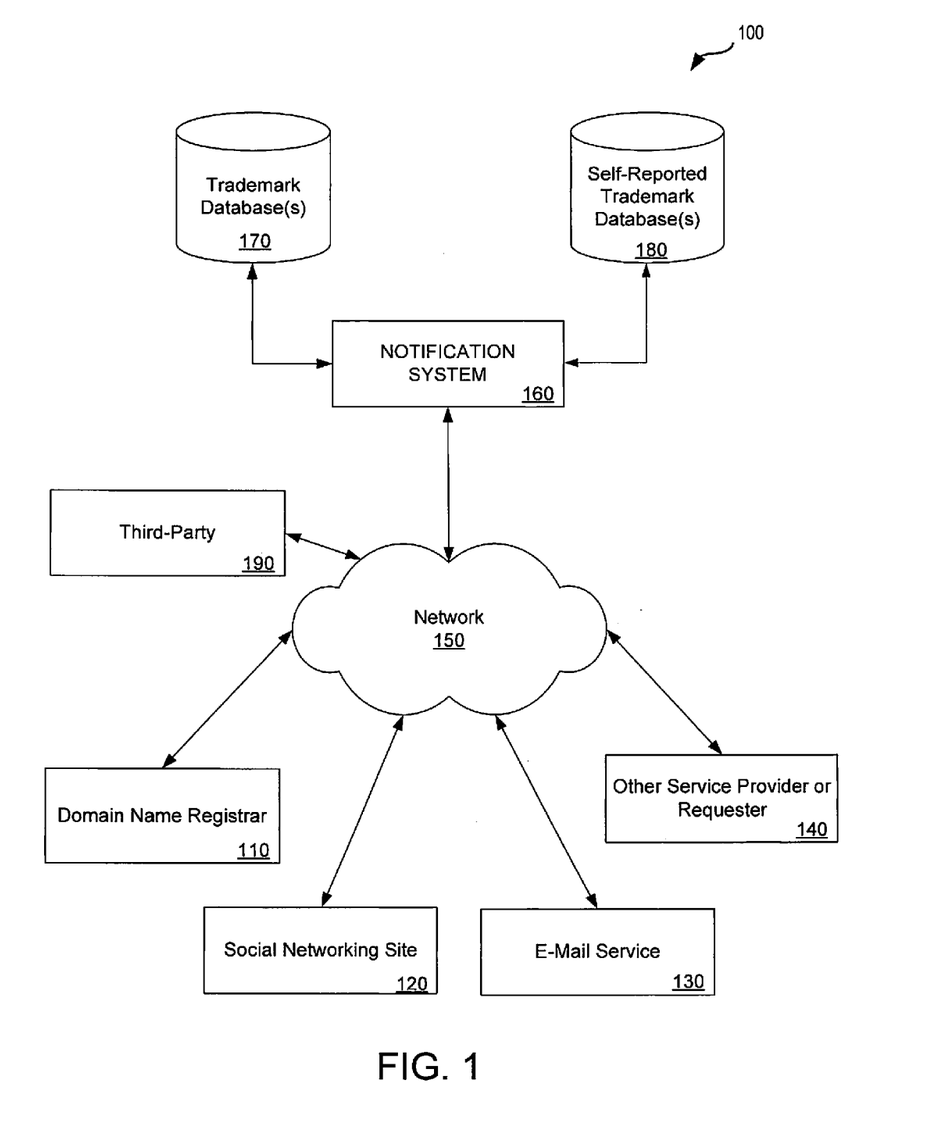
FIG. 1 illustrates an example of an environment in which some embodiments of the present invention may be utilized.

FIG. 1 illustrates an example of an environment 100 in which some embodiments of the present invention may be utilized. As illustrated in FIG. 1 a requester, such as, a domain name registrar 110, a social networking site 120, an e-mail service 130, or other service provider 140, can send a request for a trademark analysis of an identification string or other provided inputs (e.g., such as graphics or logos which can be analyzed with a graphical analysis). In accordance with some embodiments, the request can be sent through network 150 to notification system 160.

Network 150 generally refers to a group of interconnected devices capable of exchanging information. A network may be as few as several personal computers on a Local Area Network (LAN) or as large as the Internet, a worldwide network of computers. In accordance with some embodiments, network 150 includes any network capable of transmitting information from one entity to another. In some cases, network 150 may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Once the notification request has been received, notification system 160 can search various trademark databases 170 and/or self-reported trademark databases 180. A list of related trademarks can be returned to the requester and/or to third-party 190 (e.g., one of the trademark owners). The requester for a search/request/check may be a different party from a recipient of the notification. For example, a domain name registrar 110 (the requester) may request for a search before a potential registrant (the recipient) registers a domain name. In a second example, the registrar (the requester) initiates the search each month and have the results delivered to the registrant (the recipient). In both cases, the requester and the recipient are two separate parties. In a third example, the registrant of a domain name may individually elect to initiate a search/request/check for trademarks similar to a given keyword without involving any other party. In this case, the requester and the recipient of results is the same party.

Trademarks databases 170 could include external databases from around the world. For example, the US Patent & Trademark Office accepts registrations for and manages records of pending and registered US trademarks, while the UK Intellectual Property Office accepts registrations for and manages records of pending and registered UK trademarks. There exist organizations and groupings that allow for multi-jurisdictional registration of marks. One such system is the Madrid System. Another such system is the Community Trade Mark system in the European Union. Trademark data from the largest and well-known trademark offices, systems and jurisdictions can be included in the system as a base layer of data, while retaining the option of adding more data at any time.

Some trademark owners may submit their trademarks (e.g., because some jurisdictions/countries restrict access to lists of trademarks, or were simply not included in the system or unregistered marks). In accordance with various embodiments, the submission may occur via a web form, e-mail, telephone, or other method of communication to the management of this system, or to some other repository of such trademark data that may then be fed to the management of this system. This information can be stored in self reported trademark databases 180.

In some embodiments, notification system 160 may alternatively rely entirely on self-reported trademarks, where only trademarks that are reported to the management of the system will be included and returned in results. In any case of a self-reported trademark being added to the system, the self-reported trademark can optionally be verified by some means by the management of the search/check system (for instance, a manual search of the respective country/jurisdiction to ensure accuracy of the data provided by the owner of the self-reported trademark).

Self-interested trademark owners may also elect to highlight or annotate their trademark(s) if their trademark(s) appear in the results that are returned to the requester of the search/check. This request/election may be made via a web form, e-mail, telephone, or other method of communication to the management of this system. This election may also be included as part of other systems. For example, if a trademark owner decides to subscribe to an ancillary trademark-monitoring service that monitors specific trademark(s), or if trademark(s) are added to a trademark docketing system, the trademark(s) can optionally or automatically (as part of the example monitoring service or docketing system) be included for highlighting or annotating when the results (notification) are returned from a check request. This serves the purpose of notifying the result recipient that the trademark owner pays particular attention to the enforcement of their trademark.

The system's databases can accommodate additional inputs for long-term archival and storage in some embodiments. The system can receive a confirmation of acknowledgement, receipt and understanding directly from the recipient of the results. The system can also subsequently receive, from a designated party (e.g., a requester such as a domain name registrar) information about whether a term was eventually used (e.g., if a domain name SLD that was the subject of a search/request/check was eventually registered).

As described above, each of the service providers illustrated in FIG. 1, may request the trademark analysis and notification. Each one, however, has slightly different problems to motivate the request. For example, consider domain name registrar 110. In this case, the number of opportunities where an individual or entity may create a custom web address or online unique identifier has led to inadvertent and intentional instances of trademark infringement. Other examples are typosquatters and cybersquatters. A typosquatter may register 'trupadvisor.com' in place of the popular TripAdvisor (which has its web site at tripadvisor.com). A cybersquatter may register 'existingtrademark.com' where 'existingtrademark' is a hypothetical registered trademark whose owner has not registered the equivalent domain name.

In these two cases, the unlicensed user (taking the form of a typosquatter or a cybersquatter) may (a) derive advertising revenue from these domain names by placing advertisements on them, (b) pressure the rightful trademark owner into purchasing the domain name for a profitable amount of consideration (e.g., money or benefits), or (c) use the domain name for other purposes, infringing or otherwise. It may alternatively be the case that the domain name registrant has inadvertently/unwittingly registered a domain name that matches or is similar to an existing registered trademark, and is being unwittingly regarded by the owner of the registered trademark as a trademark infringer.

The extremely large number of registered domain names and registered trademarks, with more being registered each day, poses problems for at least three parties: 1) the domain name owners, 2) the trademark owners; and 3) the domain name registries and registrars. The owners are unable to keep track of all the trademarks (and their associated classes) that they might be infringing upon. For example, the use of automated parking services for domain names that are currently not in active use may cause the display of infringing advertisements. A domain name in active use with web content may also inadvertently infringe upon the rights of a trademark owner. The infringement of trademark(s) by a domain name owner could result in legal action (UDRP arbitration, ACPA lawsuit, etc.) taken against the domain name owner, which could lead to the loss of the domain name and even becoming liable for monetary damages that are awarded to the trademark owner. This problem is compounded by the fact that the number of trademarks grows continually—it is hard to keep track of new trademarks and ensure compliance of all owned domain names.

Owners of trademarks are unable to track which of the domain names may be infringing on their trademark(s). New domain names are constantly being registered, transferred, renewed, and deleted. Registrars may face devastating consequences (in the form of monetary damages being awarded against them) from ACPA and other lawsuits that allege their having a contributory role in any infringement of trademarks by allowing those potentially infringing domain names to be registered.

Examples of social networking sites 120 include, but are not limited to, Facebook, Linkedin, MySpace, and Friendster. Users of these sites have the ability to create individual 'profile pages'. Users often have the ability to 1) for personal profile pages, specify their own name (which should be a real name) that is displayed on the profile page, 2) for group/corporate profile pages, specify their group name that appears on the profile page, and 3) specify a username that is displayed as part of the web address for their personal or group profile page. In the example mentioned in the preface, Mark Zuckerberg, who is an instance of a Facebook social networking user, may register 'facebook.com/zuck', where the 'zuck' component of the web address was any string of text selected by the end user. The operators of social networking sites 120 face the risk of being entangled in legal action should users register, inadvertently or otherwise, usernames that infringe on trademarks, with these usernames being displayed on personal or group profile pages, or web addresses leading to those profile pages. As such, social networking sites can submit identification strings to notification system 160.

Regular e-mail addresses consist of two components: the username (also known as the local-part), and the domain name. In the example fool@bard.com, the part 'fool' before the @ is the username, while the part 'bard.com' is the domain name. Owners of domain names may create any number of e-mail addresses by creating usernames that are a subset of the domain name. For example, the owner of the domain name 'bard.com' can create the e-mail usernames 'fool1', 'fool2', and 'fool3', resulting in the e-mail addresses fool1@bard.com, fool2@bard.com, and fool3@bard.com.

With a 64-character long limit for the username/local-part of an e-mail address, and that subdomain names can also be used in the creation of e-mail addresses (e.g., fool@bom.bard.com for the subdomain bom.bard.com), the issue of potential misuse or trademark infringement can be a major concern for domain name owners. This is especially so for operators of free e-mail services such as aol.com, comcast.net, gmail.com and hotmail.com (e.g., someone may set up microsoftinc@gmail.com, which would be infringing on a trademark, 'Microsoft'), and for operators of free web and e-mail hosting services that allow for subdomains (e.g., if bard.com were to offer free web and e-mail hosting services, someone may set up bom.bard.com, which may conflict with a hypothetical trademark, 'bombard'). These e-mails could infringe trademarks or be used for phishing. As such, e-mail service providers 130 may use notification system 160 check for possible issues.

Other examples of service providers 140 include instant messaging (IM) services that allow for the creation of custom usernames or 'handles' which are the primary means by which an individual may be identified on these IM services. Still yet, online advertising including domain parking and domain name redirection can be problems.

Written text can also be submitted to notification system 160. Written text can take the form of a webpages with written content, blog posts, social networking status updates or notes, press releases, newspaper articles, books, novels, magazines, newspaper articled, advertisements, journals, directories, product manuals, products and packaging, research papers, textbooks, essays, e-books, audiobooks, movie scripts, television broadcast scripts or transcripts, song lyrics, talking books, text in Braille code, and more. As can be seen, these can take a printed form, a digital/electronic form, or other forms. The purpose may be academic, scientific, recreational, social, entertainment, or more.

The author of the text, or the owner/management of the medium on which the text is published, may wish to avoid use of any trademark or ensure that any mentioned trademark is fully attributed to the rightful owner by means of annotating next to the text mark a ™ (for a trade mark), a ☐ (for a service mark), or a ® (for a registered trade mark), or by a disclaimer. Examples of marks that may be present include Xerox® (a registered trademark for photocopiers), Kleenex® (a registered trademark for paper products), and Kiwi® (a registered trademark for shoe polish).

Figure 2:
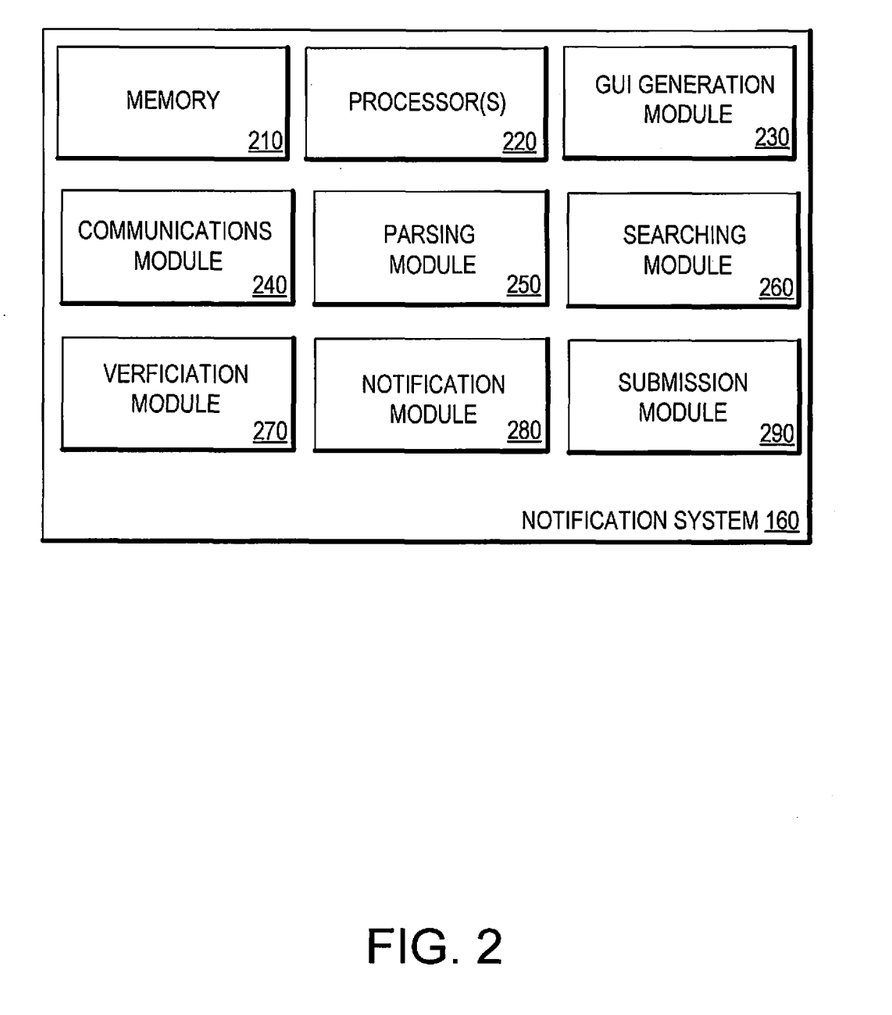
FIG. 2 shows a block diagram with exemplary components of an informing engine in accordance with one or more embodiments of the present invention.

FIG. 2 shows a block diagram with exemplary components of an informing engine in accordance with one or more embodiments of the present invention. According to the embodiments shown in FIG. 2, the notification system 160 can include memory 210, one or more processors 220, GUI generation module 230, communications module 250, parsing module 250, searching module 260, verification module 270, notification module 280, and submission module 290. Other embodiments of the present invention may include some, all, or none of these modules and components along with other modules, engines, interfaces, applications, and/or components. Still yet, some embodiments may incorporate two or more of these elements into a single module and/or associate a portion of the functionality of one or more of these elements with a different element. For example, in one embodiment, parsing module 250 and searching module 260 can be combined into a single module.

Memory 210 can be any device, mechanism, or populated data structure used for storing information. In accordance with some embodiments of the present invention, memory 210 can encompass any type of, but is not limited to, volatile memory, nonvolatile memory and dynamic memory. For example, memory 210 can be random access memory, memory storage devices, optical memory devices, media magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact disks, DVDs, and/or the like. In accordance with some embodiments, memory 210 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 210.

Memory 210 may be used to store instructions for running one or more modules, engines, interfaces, and/or applications on processor(s) 220. For example, memory 210 could be used in one or more embodiments to house all or some of the instructions needed to execute the functionality of GUI generation module 230, communications module 250, parsing module 250, searching module 260, verification module 270, notification module 280, and/or submission module 290.

GUI generation module 230 may be used to generate one or more user interface screens. For example, the GUI generation module 230 can be used to generate a user interface screen for receiving the provided input or identification string. As another example, GUI generation module 230 can generate a user interface screen to display the notification to a recipient and/or receive a verification from the user that the user has reviewed the notification In some embodiments, communications module 250 may receive a request to perform a trademark search for a provided input. Communications module 250 can translate all or part of the request into a format required by one or more other module. For example, if the request is encrypted communications module 250 can decrypt the request.

In some embodiments the provided input may result from an Internationalized Domain Name (e.g., Arabic, Chinese, Russian, and other languages that do not strictly stick to an ASCII character set can be used). This applies to two areas: the top level domains (e.g., China ccTLD domain names ending in a localized script instead of .cn) and the SLD (e.g., the 'myowndomain' part of the domain name 'myowndomain.com'). This introduces more possible SLDs, which increases chances of infringement of non-ASCII trademarks by domain names. Some embodiments of communications module 250 can handle domain names that are non-ASCII translations of ASCII trademarks. Phonetical similarity may be weighed in some embodiments of notification system 160 when considering whether a domain name that is being registered is potentially infringing on native-script trademarks from around the world.

Parsing module 250 can be used to parse the provided input into phrases for searching. In some embodiments, parsing module 250 generates phrases from each domain level for searching. For example, an individual or entity may set up a subdomain as a subsidiary component of a domain name that is owned by that individual or entity. The individual or entity owns the domain name 'myowndomain.com', and may freely set up 'tripadvisor.myowndomain.com', where 'tripadvisor' is the subdomain component of the domain name, and in this case, 'tripadvisor' is a registered trademark.

Parsing module 250 also generates phrases by removing '.'s in the domain name. For example, there has been increased use of domain hacks such as 'del.icio.us' (where .us is the TLD, and 'del' and 'icio' are subdomains, and 'icio.us' is the registered domain name). These domain hacks, when concatenated by removing the '.'s that form the entire chain (of subdomains, the SLD, and the TLD), form words that make some sense. In the case of 'del.icio.us', a popular social bookmarking website, the entire address can be concatenated into 'delicious', an easy-to-remember English word. It is possible for domain name owners to create subdomains under their domain names, and create a domain hack that may not be obvious from just the domain name (i.e., the SLD+TLD, e.g., 'nyti.ms' run by the New York Times). In certain cases, just the domain name itself can be a domain hack (i.e., the SLD+TLD, e.g., 'sen.se'—concatenated into the word 'sense'). Trademark owners may take action because, inter alia, domain hacks can be used for nefarious purposes such as phishing websites and fake, deceptive e-mail addresses. Trademark owners may take action simply because of the need to protect their brand equity. As a result, various embodiments of notification system 160 perform phonetic searches.

Searching module 260 receives the phrases from the parsing module and searches one or more databases for trademarks related to the phrases. The searching can include searches the databases for exact matches, phonetic matches, and natural language matches.

In some embodiments, verification module 270 can be used to verify that the recipient of the results of the search/request/check has received, understood, accepted, or acknowledged the results. This verification may take place via a web button generated by GUI generation module 230 (if results are displayed on a web page), via a telefax transmission (sign and fax back for manual or automated review and acceptance), via responses to telephone voice prompts (Third Party Verification via transfer or 3-way call; or simply an audio recording of vocal responses), express or regular mail (sign document that bears the results and return to system operator via mail), via delivery confirmation (similar to legal service of documents), or a combination of any of these with any original method of delivering the request for acknowledgment (e.g., print out a webpage or e-mail attachment, sign, then return via scan, telefax, or postal mail).

Upon confirming this verification (of receipt, understanding, acceptance or acknowledgement), the original requester of the search/request/check or the recipient of the result may want to make the confirmation of verification of receipt, understanding, acceptance or acknowledgement available to a third party, such as a trademark owner. The original requester of the search/request/check or the recipient of the result may optionally make the fact that the search has taken place available to a third party. This notification of a third party may take place immediately and automatically, or manually/optionally. Immediately/automatically—for example, immediate notification may be useful for trademark owners (a third party) who may want to aggregate statistics about where their trademarks are being used. Manually/optionally—delayed and optional notification of a third party may be useful where a recipient or requester wants to show that adequate due diligence had been performed prior to the use of a certain keyword.

In some embodiments, verification module 270 generates a digital stamp generated from (i) the time of the search/request/check, and (ii) the results of the search/request/check, accompanies the notification to prove that the results were truly valid at the time of the search. The notification/information may optionally include the fact that the recipient had confirmed receipt of the results of the search/request/check.

Notification module 280 can be used to generate and track the notifications. In some embodiments, notification module 280 receives the trademarks related to the phrases and generates the notification. The notification can be delivered to a third party and/or the original requestor.

The notification of a third party could be useful in an example of a domain name owner, who may own a domain name. The domain name owner is under legal pressure to transfer it to a trademark owner due to allegations that the domain name was infringing on a registered trademark. However, the results received by the domain name owner may not have included the trademark in question (for example, the trademark may have become public knowledge shortly after the domain name was registered), and a notification may be made to the third party (in this case, a trademark owner) that reasonable effort had already been made to determine that the domain name registration would not be infringing.

The notification of a third party could also be useful in an example of a domain name registrar, which may receive tens of thousands of registrations or renewals per year. If a domain name is regarded as possibly infringing on a trademark, the trademark owner may attempt to take legal action against the registrar as well. The registrar can notify the trademark owner with the results of the search/request/check to demonstrate that it had already made a good faith effort (as the requester) in providing notice to the domain name registrant (as the recipient of results) before the registration of the domain name had taken place, and that the registrant was fully responsible for the domain name. The notification of a third party could also be useful in the following example: Upon the registration of a domain name, a registrar (requester) may chose to automatically provide trademark owners (a third party) with a notice that the registrant had registered a name and was aware of similar trademarks, in exchange for immunity against claims of trademark infringement.

In accordance with some embodiments, this notification/information may be made available to the trademark owner or any other third party (e.g., a court) through a web- or software-based user interface. The trademark owner or other third party may alternatively be notified by a multitude of other means: a webpage, an table within a webpage, an overlay on a webpage, a website pop-up, an e-mail message, an e-mail message with a link to a webpage (essentially, anything that results in the results being displayed on a visual display unit or VDU), a telefax transmission, a telegraphic transmission, a telephone call, express mail services (e.g., UPS, FedEx, DHL), regular mail services (e.g., via USPS mail), via hand delivery, and/or other information transmission methods. The original requester may require the third party abide by a legal agreement, e.g., indemnify the requester or the recipient of results from legal action, or may bind the third party to a non-disclosure agreement.

In some embodiments, the output of search/request/check is possibly a list, which can take the form of a table with these possible columns: the relevant trademark detected, % degree of relevance and/or the % degree of similarity, date(s), status, classes, serial number/identifiers, image(s), description(s), jurisdiction(s), owner data, and other identifying and/or classifying information such as past lawsuits/disputes over the use of that keyword. Other forms of data output include a digital or printable report, a database, a webpage with links, an e-mail message, an audio message, and more. Notification module 280 can determine a degree of relevance for each trademark and possibly remove any below a certain threshold. The degree of relevance (which can take the form of a weight, ranking, rating, score, or percentage) is calculated from one or a combination of several factors, including but not limited to the following:

(i) Using phonetic and natural language processing techniques, the keyword used for the search/request/check can be compared to all similar trademarks and a similarity score assigned to each individual match.

(ii) By automatic detection (e.g., contextual analysis of i—surrounding text on a webpage or newspaper article, or ii—a description provided by the enquirer) or manual input (e.g., typed in by the enquirer or the completion of a questionnaire) of the likely classes in which the enquirer (e.g., the domain name registrant, or potential trademark registrant) is likely to or is already using the keyword, followed by a comparison of those classes with the classes of trademarks with similar keywords. A higher number of matching classes indicates a greater degree of relevance.

(iii) Status—a live or pending trademark is more relevant than a dead, expired, or abandoned trademark.

(iv) Filing, First Use, and/or Registration Date—an earlier trademark is possibly, in certain cases, more important than a newer trademark. User or operator of system may specify what weights are applied to each category of dates.

(v) Description—a higher number of keyword matches between the description of the trademark and the context of use of the keyword that is being enquired (e.g., text on a webpage, text surrounding the keyword being used) implies a higher degree of relevance.

(vi) Jurisdiction—a result from the search/request/check is deemed more relevant if it falls into the trademark jurisdiction where the recipient of the result is planning to use the keyword. In the specific case of domain names, this may depend on the TLD extension—a ccTLD owner, for example, would need to be especially notified of similar trademarks in the jurisdiction of the country that is represented by said ccTLD.

(vii) Involvement of trademark owner—if trademark owner has elected to highlight the owned trademark in results of each enquiry, then trademark is possibly more relevant due to the vigilant state of the trademark owner.

(viii) Additionally, if there has been dispute(s) over the trademark (e.g., at the USPTO's Trademark Trial and Appeal Board), or if there has been enforcement activity over the trademark (e.g., legal cases), then the trademark is likely to be more relevant.

(ix) The degree of 'noise' surrounding a trademark needs to be calculated to produce the degree of relevance of a particular result. A greater deal of mentions of a particular trademark in the mass media, on the Internet (e.g., number of search results), the greater the relevance.

(x) Top brands—a custom list of top brands for each jurisdiction can be custom-curated and additional relevance assigned to those top brands when the degree of relevance is being calculated.

(xi) Relative relevance—to achieve a rank, the results of an enquiry may have to be compared with each other to determine the absolute rank/order of each trademark in the results.

(xii) Recurring result—whether this search/request/check has been performed before for this particular recipient, and a specific result it has been 'marked as read' or 'regarded as irrelevant', could potentially change or decrease the degree of relevance.

In some embodiments, notification module 280 will sort the trademarks by the degree of relevance when first presented to the recipient of the results. The recipient may then choose to sort the results by other metrics e.g., filing date.

Submission module 290 can be configured to receive submissions from trademark owners with information regarding one or more trademarks. The information can be stored in self-reported trademark database 180. In some embodiments, submission module 290 can use GUI generation module to create a submission interface that allows owners to submit the information.

Figure 3:
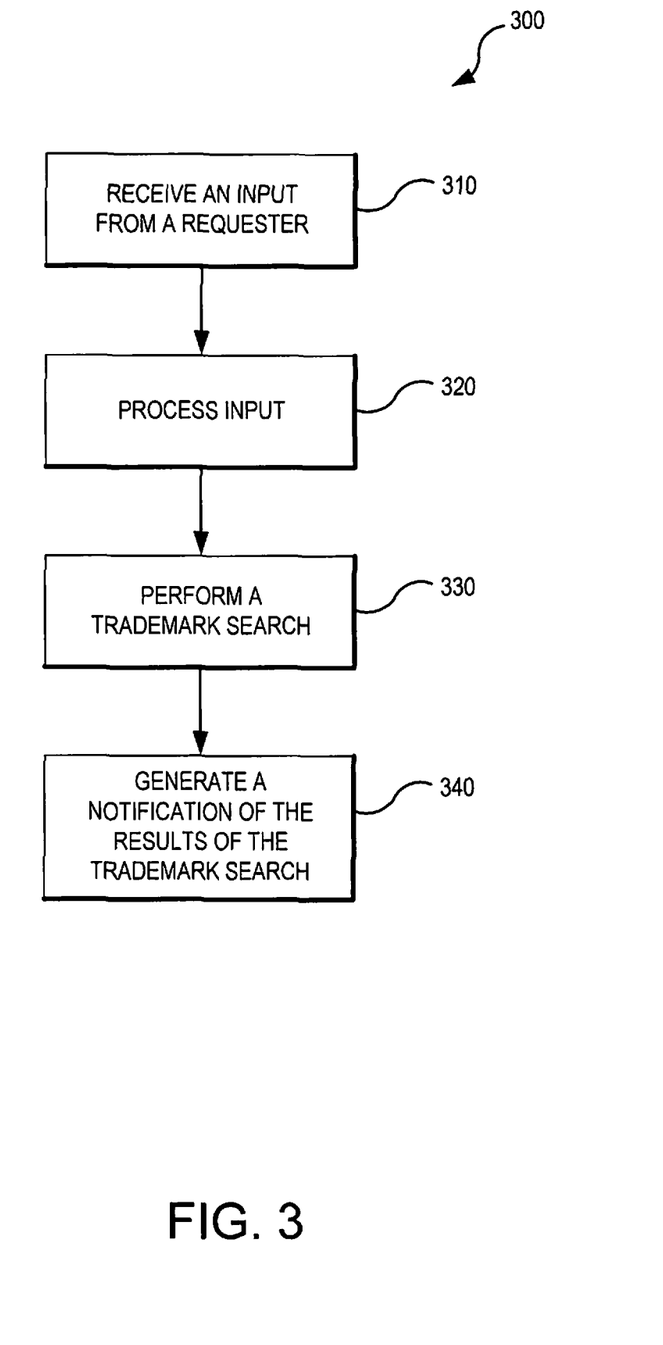
FIG. 3 is a flow chart illustrating exemplary operations for performing a trademark search in accordance with some embodiments of the present invention.

FIG. 3 is a flow chart illustrating exemplary operations for performing a trademark search in accordance with some embodiments of the present invention. In accordance with some embodiments, one or more of the operation illustrated in FIG. 3 can be performed by communications module 240, parsing module 250, searching module 260, notification module 280, and/or other system components or modules. As illustrated in FIG. 3, an input (e.g., domain name, e-mail address, or other identification string) is received from a requester during receiving operation 310. The requester can be an individual, an organization, or a service provider (e.g., domain name registrar 110, social networking site 120, e-mail service provider 130, etc.)

Once the input is received, processing operation 320 processes the input. In some embodiments, when the input is a SLD, the processing can include parsing out the keyword 'domain' in 'domain.com', if keyword had not already been parsed out before search/request/check commences. These strings can be used during searching operation 330 where the string is compared against database of all trademarks to detect trademarks that are similar. When searching operation detects trademarks that are similar (e.g., via a comparison of (i) description/statement of intended use of domain name, and/or (ii) web content of domain name including multilevel content, with the descriptions/classes of all trademarks that were detected as similar to determine the degree of similarity with greater accuracy. 'multilevel content' refers to 'deep crawling' of a given domain name), notification operation 340 can generate a notification of the results.

If the input is in a foreign, native script, then comparison (of keyword and database of known trademarks) via transliteration may be utilized during processing operation 320. Conversion of encoding may also be necessary. Additional methods include parsing or comparing for similarity in appearance and pronunciation (e.g., usage of similar ideograms, radicals, and morphemes). As the same written form may be pronounced differently in different regions, the region in which the keyword will be used is an important factor in helping to source for similar trademarks.

Processing operation 320 can be utilize a domain hack detection algorithm in some embodiments. A domain hack takes the form of 'part1.part2.part3', and as with any domain name, has to have at least two parts. As a result, domain hack detection algorithm concatenates the keyword inputs. For example, in the case of 'part1.part2.part3', concatenating combinations of levels, divided by a. (full stop/period), creates a number of inputs: 'part1part2', 'part2part3', and 'part1part2part3'. For example, del.icio.us yields 'delico', 'icious', and 'delicious'. Each of these is used as input for multiple search/request/checks. Procession operation 320 can process descriptive content (a statement or multilevel web content) for comparison with the descriptions/classes of all trademarks that were detected as similar to determine the degree of similarity with greater accuracy.

In some embodiments, the input is a user name from a social networking website or a IM user name, processing operation 320 receives input of username string and comparison of said string against database of all trademarks to detect trademarks that are similar. The username is often a public-facing identifier that may be displayed and transmitted via a page or as a component of a web address. In addition, processing operation 320 can process an input of a string of one or multiple words that could be used in profile names, group names, comments, or anywhere else where a long string may be entered on the social networking site. Then searching operation 320 generates a comparison (i) of each word of string and (ii) of combination of words and phrases within string—with known trademarks in system can then take place.

In accordance with some embodiments, when the input is an e-mail address, processing operation generates a username string i.e. portion before @ sign in e-mail address (e.g., 'username' part of username@domain.com). Comparison of that string against database of all trademarks to detect trademarks that are similar occurs with searching operation 330.

In some embodiments, the input can be a string of one or multiple words obtained from written text, advertising text, or header/headline. Then, searching operation 330 can generate a comparison (i) of each word of string and (ii) of combination of words and phrases within string—with known trademarks in system can then take place.

In some embodiments, the input is a list of domain names, e-mail addresses, user names, etc. When multiple inputs are received in a batch, processing operation 320 first determines the type of input and processes each item in accordance with the input type. The searching operation 330 generates a search of each entry.

Figure 4:
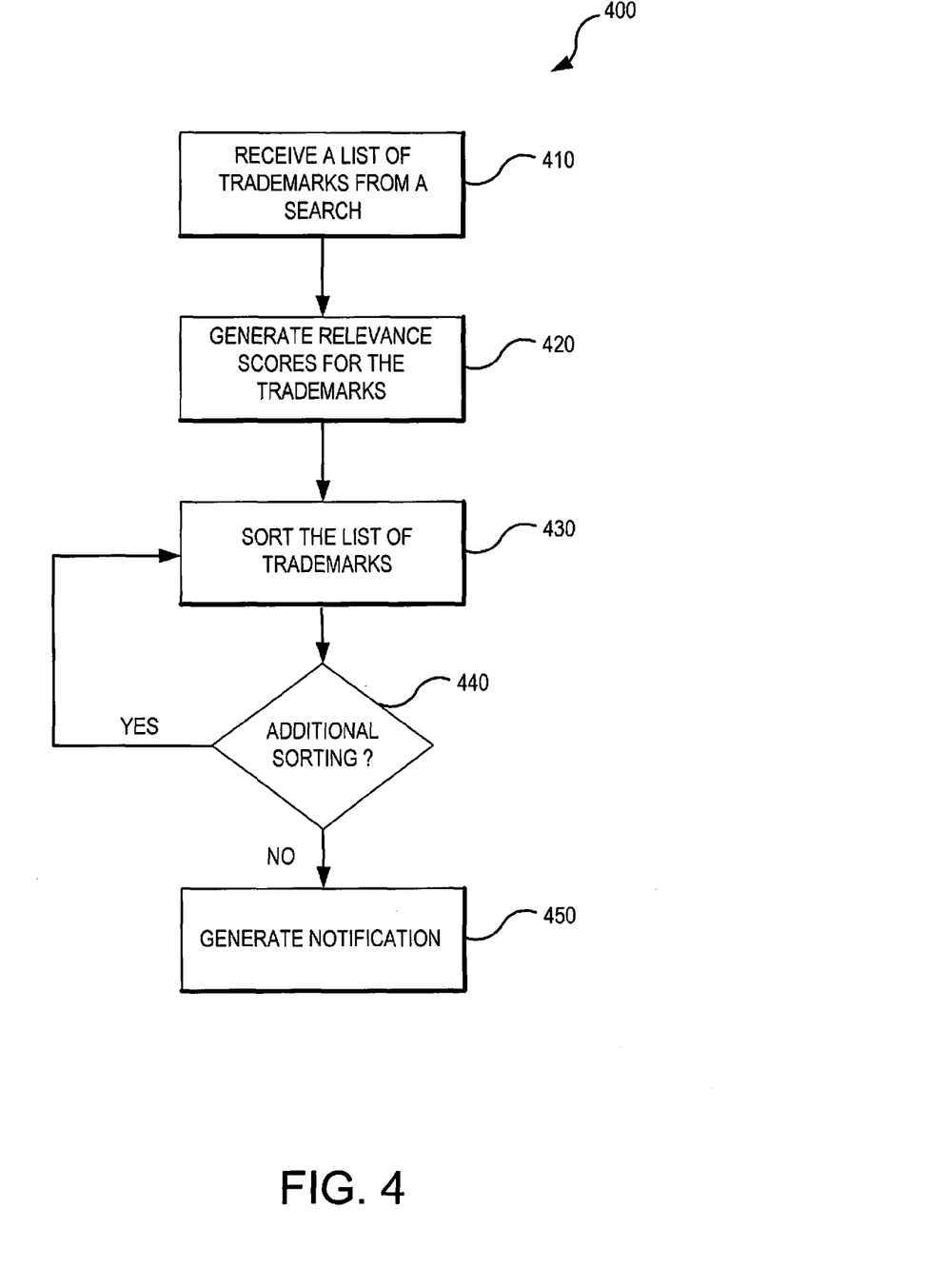
FIG. 4 is a flow chart illustrating exemplary operations for generating a notification in accordance with various embodiments of the present invention.

FIG. 4 is a flow chart illustrating exemplary operations for generating a notification in accordance with various embodiments of the present invention. In accordance with some embodiments, one or more of the operation illustrated in FIG. 4 can be performed by notification module 280 and/or other system components or modules. As illustrated in FIG. 4, receiving operation receives a list of trademarks from a search. Generation operation generates a relevance score for each of the trademarks in the list. The degree of relevance (which can take the form of a weight, ranking, rating, score, or percentage) is calculated from one or a combination of several factors discussed above in conjunction with notification module 280. Sorting operation 430 can sort the trademarks based on the calculated relevance. In some embodiments, sorting operation 430 may remove trademarks from the list that fall below a certain relevance level.

The 'degree of relevance of result set' can be calculated based on information derived from or associated with individual results within each result set. This 'degree of relevance of result set' may take the form of a score/rank/percentage weight given to each result set. This 'degree of relevance of result set' can help a person who is viewing a large number of result sets to choose the most relevant ones to review. The requester may optionally request that the system returns the 'degree of relevance of result set' to the requester. For example, a requester may wish to allow all actions (such as username registration) to proceed, but review or block only those actions (such as username registration) that, after being subject to a search/request/check, produces a result set that falls above a 'degree of relevance result set' threshold.

The results can be presented to a recipient (e.g., through a GUI generated by GUI generation module 230). The user can request addition sorting based on one or more fields (e.g, application number, first use date, etc). Detection operation 440 determines if the recipient has requested any additional sorting. If a determination is made that additional sorting has been requested detection operation 440 branches to sorting operation 430 where additional sorting is performed based on the criteria received. If a determination is made that no additional sorting has been requested, the detection operation 440 branches to generation operation 450 where a notification can be generated.

In some embodiments, all actions (e.g., tens of thousands of domain name registrations) are subject to a search/request/check process, and a score/rank/percentage weight given to each action, so that the requester can prioritize which sets of results to review, e.g., the top 1000 sets per day, or the top 10% of each week's search/request/check results. This allows the requester to allow all actions (e.g., domain name registrations), and review them at a later time. In some embodiments, the requester (e.g., a domain name registrar) may opt to perform a background check for all actions, and allow only those whose score/rank/percentage weights fall below a certain threshold, with the remainder requiring manual review and authorization.

Various embodiments also allow a service provider to elect to integrate the search/request/check into its Terms of Sale, Terms of Service, or some other kind of legal agreement. It may require the search/request/check as a prerequisite for the sale of a good or the registration of a term (e.g., registration of a domain name, renewal of a domain name, transfer of a domain name, signup for an e-mail address). It may alternatively or additionally state that the registration may be revoked if the results of a search/request/check indicate issues of concern. The service provider, as a requester, may choose to initiate the search/request/check only upon a party's agreement to the legal agreement. This may take the form of a web form.

Figure 5:
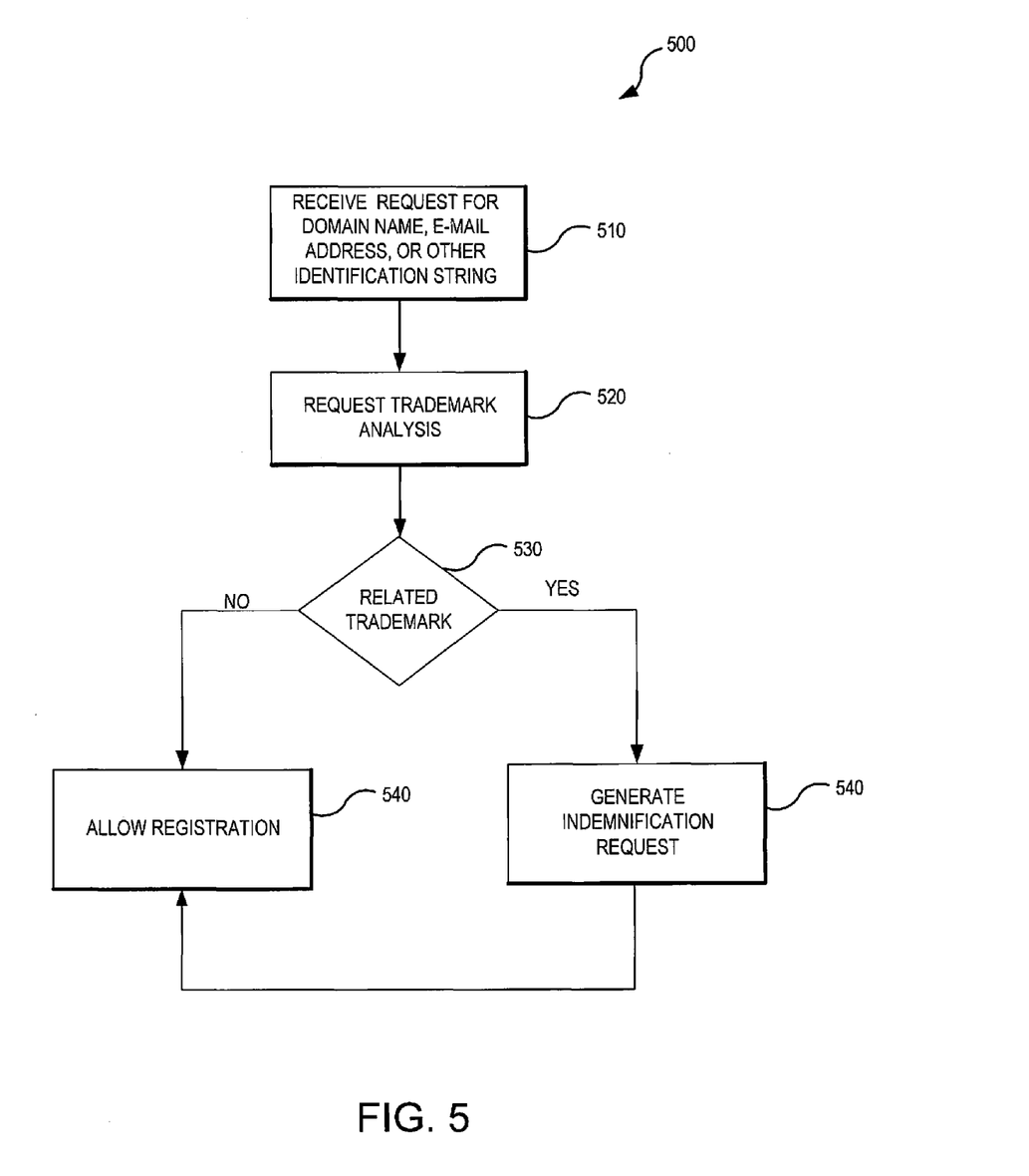
FIG. 5 is a flow chart illustrating a set of exemplary operations for a service provider to allow a registration in accordance with one or more embodiments of the present invention.

FIG. 5 is a flow chart illustrating a set of exemplary operations for a service provider to allow a registration in accordance with one or more embodiments of the present invention. A request for a trademark analysis of a domain name, e-mail address, or other identification string is received during receiving operation 510. A trademark analysis is requested during requesting operation 520.

Initiating a search/request/check during request operation 520, whether as part of an automated process (e.g., upon a user attempting to register a domain name, or on a regular basis such as monthly or daily) or as a result of a manual request, will result in a 'notification' of results that may be delivered to a recipient (not necessarily the original requester) via a combination of one or more of the following methods: a webpage, an table within a webpage, an overlay on a webpage, a website pop-up, an e-mail message, an e-mail message with a link to a webpage (essentially, anything that results in the results being displayed on a visual display unit or VDU), a telefax transmission, a telegraphic transmission, a telephone call, express mail services (e.g., UPS, FedEx, DHL), regular mail services (e.g., via USPS mail), via hand delivery, and/or other information transmission methods.

The request or checks may optionally take place only once upon the occurrence of a specific event, e.g., when someone is registering a domain name, creating a subdomain, creating domain hacks using a string of subdomains, creating a publicly-accessible and viewable username or handle for social networking, IM, e-mail and other services, or transferring, selling, or auctioning any of the earlier examples of domain names, subdomains, usernames, or when a piece of written text needs to be reviewed for the presence of trademarks or trademark-similar terms or phrases. Checks for any given term may alternatively take place at modifiable or pre-defined regular intervals, where new trademarks and previously-detected (but since modified) trademarks are detected and returned to the initiator of the check. Checks may also take place on an ad-hoc basis, where the results are only requested when needed.

Results returned for any request can take the form of all relevant trademarks, or can include only trademarks that are new or have changed since the previous search/request. If determination operation 530 determines that no related trademarks, or no new trademarks, have been found, the registration is completed during allowance operation 540. If determination operation 530 determines that related trademarks, or new trademarks, have been found then generation operation 550 can generate an indemnification request. Once the user accepts the indemnification request, the service provider will complete the registration.

In accordance with some embodiments, the agreement to indemnity may be one or many agreements. For example, in some embodiments, in or to allow registration a confidentiality and or other legal agreement by third party for benefit of requester and/or recipient if a third party (such as a trademark owner) wants to be notified of whenever a trademark appears in any result. Third party may confirm indemnity and/or confidentiality for requester and/or recipient via a variety of means: via a web button (if agreement is displayed on a web page), via a telefax transmission (sign and fax back for manual or automated review and acceptance), via responses to telephone voice prompts (Third Party Verification via transfer or 3-way call; or simply an audio recording of vocal responses), express or regular mail (sign document that bears the agreement and return to system operator or any designated party via mail), any other original method of delivering the request for an agreement (e.g., print out a webpage or e-mail attachment, sign, then return via scan, telefax, or postal mail), or a combination of any of these.

A note that an agreement (of any sort) had been endorsed and executed may be made available to the subject of the agreement, e.g., the requester or recipient. The execution of an agreement by a third party may be delivered as part of the results (possibly as an indicator that accompanies each trademark result) received by recipient.

Exemplary Computer System Overview

Figure 6:
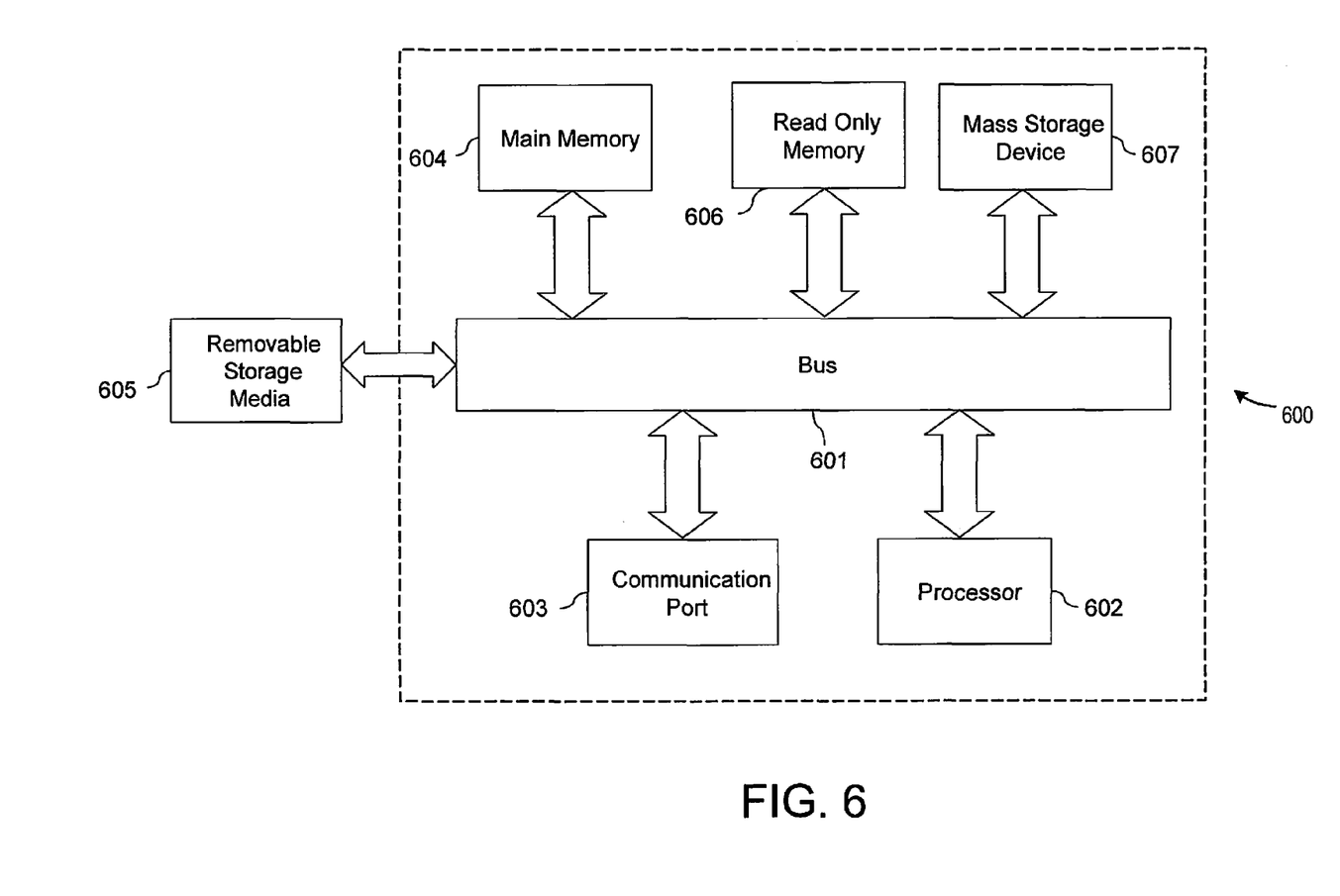
FIG. 6 illustrates an example of a computer system with which some embodiments of the present invention may be utilized.

Embodiments of the present invention include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 6 is an example of a computer system 600 with which embodiments of the present invention may be utilized. According to the present example, the computer system includes a bus 605, at least one processor 610, at least one communication port 615, a main memory 620, a removable storage media 625, a read only memory 630, and a mass storage 635.

Processor(s) 610 can be any known processor, such as, but not limited to, an Intel® Itanium® or Itanium 2® processor(s), or AMD® Opteron® or Athlon MP® processor(s), or Motorola® lines of processors. Communication pots) 615 can be any of an RS-232 port for use with a modem based dialup connection, a 10/100 Ethernet port, or a Gigabit port using copper or fiber. Communication port(s) 615 may be chosen depending on a network such a Local Area Network (LAN), Wide Area Network (WAN), or any network to which the computer system 600 connects.

Main memory 620 can be Random Access Memory (RAM), or any other dynamic storage device(s) commonly known in the art. Read only memory 630 can be any static storage device(s) such as Programmable Read Only Memory (PROM) chips for storing static information such as instructions for processor 610.

Mass storage 635 can be used to store information and instructions. For example, hard disks such as the Adaptec® family of SCSI drives, an optical disc, an array of disks such as RAID, such as the Adaptec family of RAID drives, or any other mass storage devices may be used.

Bus 605 communicatively couples processor(s) 610 with the other memory, storage and communication blocks. Bus 605 can be a PCI/PCI-X or SCSI based system bus depending on the storage devices used.

Removable storage media 625 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

The components described above are meant to exemplify some types of possibilities. In no way should the aforementioned examples limit the scope of the invention, as they are only exemplary embodiments.

In conclusion, the present invention provides novel systems, methods and arrangements for trademark searching and notification. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. A method implemented on a computer system to ensure that a domain name registration would not infringe a trademark, comprising:
   receiving, from a requester, a request for an internet domain name;
   determining a degree of relevance between the internet domain name and at least one trademark, wherein the degree of relevance comprises a combination of:
      a similarity score determined by comparing characters in the trademark with characters in the internet domain name; and
      a class comparison score determined by comparing trademark classes associated with the at least one trademark with trademark classes associated with the internet domain name, wherein a higher number of matching classes corresponds to a greater degree of relevance;
   retrieving, by the computer system, a notice of the at least one trademark;
   displaying, by the computer system, a notification to the requester, the notification based in part on the notice and a relation between the degree of relevance and a threshold;
   receiving, by the computer system, acknowledgement of the notification from the requester; and
   causing, by the computer system, the internet domain name to be registered based in part on the determined degree of relevance, wherein the causing includes making the acknowledgement available to a third party.

2. The method of claim 1, wherein the degree of relevance further comprises a determination whether the internet domain name is an identical match to the trademark.

3. The method of claim 1, wherein the degree of relevance further comprises a determination whether the internet domain name is a typo of the trademark.

4. The method of claim 1, wherein the requester is an end-user, wherein the request for the internet domain name was generated by a domain name registrar, and wherein the request for the internet domain name was generated in response to the end-user visiting a website of the domain name registrar and typing in the internet domain name.

5. The method of claim 1, further comprising:
   parsing the internet domain name into phrases for searching.

6. The method of claim 1, wherein the combination further comprises:
   an indication of the trademark status;
   a jurisdiction associated with the trademark; and
   a comparison of a relative relevance of a first degree of relevance for a trademark and a second degree of relevance for a trademark.

7. A method implemented on a computer system to ensure that a domain name registration would not infringe a trademark, comprising:
   receiving, from a requester, a request to perform a search related to an internet domain name;
   determining a degree of relevance between the internet domain name and at least one trademark, wherein the degree of relevance comprises a combination of:
      a similarity score determined by comparing characters in the trademark with characters in the internet domain name; and
      a class comparison score determined by comparing trademark classes associated with the at least one trademark with trademark classes associated with the internet domain name, wherein a higher number of matching classes corresponds to a greater degree of relevance;
   sending, to the requester and by the computer system, a message based on the degree of relevance determination, wherein the message triggers a notification of the at least one trademark to be presented to an end-user, the notification based in part on a relation between the degree of relevance and a threshold; and receiving, by the computer system, a request to register the internet domain name, wherein the request includes an acknowledgement of the notification of the at least one trademark by the end-user.

8. The method of claim 7, wherein the degree of relevance further comprises a determination whether the internet domain name is an exact match to the trademark.

9. The method of claim 7, wherein the degree of relevance further comprises a determination whether the internet domain name is a typo of the trademark.

10. The method of claim 7, wherein the requester is a domain name registrar, wherein the receiver of the request to perform the search is a registry, and wherein the request to perform the search was generated in response to an end-user visiting a website of the domain name registrar and typing in the internet domain name.

11. The method of claim 10, wherein the registry creates a unique identifier based on the degree of relevance.

12. The method of claim 11, wherein the domain name registrar uses the unique identifier for verification.

13. The method of claim 7, further comprising:
parsing the internet domain name into phrases for searching.

14. A computer system comprising:
at least one processor; and
at least one memory coupled with the at least one processor, the at least one memory storing instructions which, when executed by the processor, cause the computer system to perform the steps of:
receiving, from a requester, a request for an internet domain;
causing a database search for trademarks related to the internet domain;
identifying at least one trademark based upon a degree of relevance between the internet domain name and the at least one trademark, wherein the degree of relevance comprises a combination of:
a similarity score determined by comparing characters in the trademark with characters in the internet domain name; and
a class comparison score determined by comparing trademark classes associated with the at least one trademark with trademark classes associated with the internet domain name, wherein a higher number of matching classes corresponds to a greater degree of relevance;
retrieving, by the computer system a notice of the at least one trademark;
displaying, by the computer system, a notification to the requester, the notification based in part on the notice and a relation between the degree of relevance and a threshold;
receiving, by the computer system, acknowledgement of the notification from the requester; and
causing, by the computer system, the internet domain to be registered based in part on the determined degree of relevance, wherein the causing includes making the acknowledgement available to a third party.

15. The computer system of claim 14, wherein the degree of relevance further comprises a determination whether the internet domain is an identical match to the trademark.

16. The computer system of claim 14, wherein the degree of relevance further comprises a determination whether the internet domain is a typo of the trademark.

17. The computer system of claim 14, wherein the requester is an end-user, and wherein the receiver of the request for the internet domain is a domain name registrar.

18. A computer system comprising:
at least one processor; and
at least one memory coupled with the at least one processor, the at least one memory storing instructions which, when executed by the at least one processor, cause the computer system to perform the steps of:
receiving, from a requester, a request to perform a search related to an internet domain name;
determining a degree of relevance between the internet domain name and the at least one trademark, wherein the degree of relevance comprises a combination of:
a similarity score determined by comparing characters in the trademark with characters in the internet domain name; and
a class comparison score determined by comparing trademark classes associated with the at least one trademark with trademark classes associated with the internet domain name, wherein a higher number of matching classes corresponds to a greater degree of relevance; and
receiving, by the computer system, a request to register the internet domain by the end-user based in part on a relation between the degree of relevance and a threshold.

19. The computer system of claim 18, wherein the degree of relevance further comprises a determination whether the internet domain is an identical match to the trademark.

20. The computer system of claim 18, wherein the degree of relevance further comprises a determination whether the internet domain is a typo of the trademark.

21. The computer system of claim 18, wherein the requester is a domain name registrar, and wherein the receiver of the request to perform the search is a registry.

\* \* \* \* \*